(12) United States Patent
Ueno et al.

(10) Patent No.: US 7,179,401 B2
(45) Date of Patent: *Feb. 20, 2007

(54) THERMOTROPIC LIQUID-CRYSTALLINE POLYMER

(75) Inventors: Ryuzo Ueno, Nishinomiya (JP);
Masaya Kitayama, Takarazuka (JP);
Kiichi Kometani, Ikeda (JP); Hiroyuki Kato, Kawanishi (JP); Motoki Asahara, Sanda (JP)

(73) Assignee: Kabushiki Kaisha Ueno Seiyaku Oyo Kenkyujo, Osaka (JP)

( * ) Notice: Subject to any disclaimer, the term of this patent is extended or adjusted under 35 U.S.C. 154(b) by 351 days.

This patent is subject to a terminal disclaimer.

(21) Appl. No.: 10/480,866

(22) PCT Filed: Jun. 11, 2002

(86) PCT No.: PCT/JP02/05782

§ 371 (c)(1),
(2), (4) Date: Dec. 15, 2003

(87) PCT Pub. No.: WO02/102874

PCT Pub. Date: Dec. 27, 2002

(65) Prior Publication Data

US 2004/0256599 A1 Dec. 23, 2004

(30) Foreign Application Priority Data

Jun. 15, 2001 (JP) ............................. 2001-181647

(51) Int. Cl.
*C09K 19/38* (2006.01)
*C08G 63/60* (2006.01)
*C08G 63/64* (2006.01)
*C08G 63/664* (2006.01)

(52) U.S. Cl. ................. 252/299.01; 528/176; 528/190; 528/193; 528/194; 528/218

(58) Field of Classification Search ........... 252/299.01; 525/436, 437, 450; 528/206, 176, 190, 193, 528/194, 218
See application file for complete search history.

(56) References Cited

U.S. PATENT DOCUMENTS

| | | | | |
|---|---|---|---|---|
| 4,542,203 A | * | 9/1985 | Ueno et al. ................. | 528/126 |
| 5,276,107 A | * | 1/1994 | Kim et al. .................. | 525/436 |
| 5,770,766 A | * | 6/1998 | Ueno et al. ................. | 562/467 |
| 6,051,664 A | * | 4/2000 | Nagashima et al. ........ | 525/444 |
| 6,984,712 B2 | * | 1/2006 | Ueno et al. ................. | 528/206 |

FOREIGN PATENT DOCUMENTS

| | | |
|---|---|---|
| DE | 33 46 549 A | 6/1984 |
| EP | 1 103 573 A1 | 5/2001 |
| JP | 3-275715 A | 12/1991 |

* cited by examiner

*Primary Examiner*—Shean C. Wu
(74) *Attorney, Agent, or Firm*—Sughrue Mion, PLLC

(57) ABSTRACT

A thermotropic liquid crystalline polymer, which is obtainable by copolymerizing a trifunctional hydroxynaphthalene carboxylic acid represented by the general formula (I) and/or reactive derivative thereof with other polymerizing monomer(s)

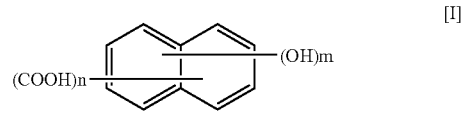

[I]

wherein one of m and n is 1 and the other is 2, and a composition including the polymer are provided. The molded article obtained from the thermotropic liquid crystalline polymer or the composition has less anisotropy in mechanical strength and improved weld strength.

19 Claims, No Drawings

THERMOTROPIC LIQUID-CRYSTALLINE POLYMER

TECHNICAL FIELD

The present invention relates to a novel thermotropic liquid-crystalline polymer, a composition comprising the thermotropic liquid crystalline polymer and a molded article made of the same. According to the present invention, some significant drawbacks with molded articles made of conventional thermotropic liquid crystalline polymers including high mechanical anisotropy and low weld strength can be minimized.

BACKGROUND ART

In these days, demand for high performance plastics are more and more increasing and novel polymers with a variety of functions have been developed. Among these plastics, liquid crystalline resins which exhibit optical anisotropy and are characterized in that their molecular chains are aligned in parallel directions in molten state (thermotropic liquid crystalline polymer) have drawn the attention because of their excellent flow and mechanical properties. In addition, depending on the molecular structure, they have high deflection temperatures under load as well as high continuous use temperatures.

The resin compositions made of thermotropic liquid crystalline polymers with such properties filled with fibrous reinforcing agents such as glass fiber or inorganic fillers have been suitably used for a variety of products such as electric and electronic components including computer-related parts, machine components and precision machine components. For example, they have been applied for motor components such as connector, relay case, switch, coil bobbin, condenser, connector, speaker, committator and separator and used for shielding elements such as coil, crystal and IC chip.

On the other hand, the molecules of such thermotropic liquid crystalline polymers as above are easily oriented with even slight shear strength. Accordingly, there are some drawbacks in a molded article, such as the significant difference of the mold shrinkage between in the machine direction (MD) parallel to the material's flow in molding and the transverse direction (TD) to the MD. In other words, the molded article has high anisotropy in mechanical strength. As such, the polymer has poor strength at the weldline when the article has a weldline.

In order to improve such decreased mechanical properties due to the orientation of molecules or the anisotropy at molding, the art has proposed various methods. For example, Japanese Patent Publication (KOKOKU) No. 38007/1993 discloses a method for preparation of aromatic polyesters by polycondensating certain compounds, characterized in that compounds having polyfunctional groups such as 1,3,5-trihydroxy benzene, 3,5-dihydroxybenzoic acid, 5-hydroxy isophthalic acid or functional derivatives thereof are added to the reaction system. With this method, aromatic polyesters with improved molding properties and reduced anisotropy can be obtained without substantially degrading their thermal properties. The publication teaches those multifunctional compounds such as 1,3,5-trihydroxy benzene and the others can provide polymers with good thermal stability because of their less steric hindrance and high reactivity.

However, said method do not provide satisfying effect in improving weld strength and reducing anisotropy in molding shrinkage factors in the thermotropic liquid crystalline polymers.

DISCLOSURE OF INVENTION

Problems to be Solved By the Invention

The object of the present invention is to provide a thermotropic liquid crystalline polymer which can provide a molded article with less anisotropy in mechanical strength and improved weld strength, a composition comprising the thermotropic liquid crystalline polymer and a molded article made of the same as well as a manufactured article thereof such as fiber and film.

The present inventors have found that a thermotropic liquid crystalline polymer of which main chains are regularly aligned in parallel directions in molten state to give anisotropic melt phase and suitable for melt processing can be obtained by copolymerizing certain trifunctional hydroxynaphthalene carboxylic acid with other polymerizing monomer(s), and have completed the invention.

The present invention provides a thermotropic liquid crystalline polymer obtained by copolymerizing a trifunctional hydroxynaphthalene carboxylic acid represented by the general formula (I) and/or a reactive derivative thereof with other polymerizing monomer(s):

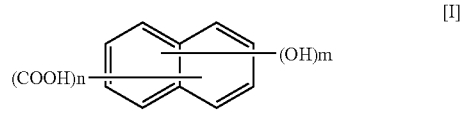

wherein one of m and n is 1 and the other is 2.

The thermotropic liquid crystalline polymer of the present invention exhibits optical anisotropy.

The thermotropic liquid crystalline polymer comprising the trifunctional hydroxynaphthalene carboxylic acid represented by the general formula (I) exhibits improved weld strength and less anisotropy in mechanical strength than conventional thermotropic liquid crystalline polymers having these drawbacks.

In the thermotropic liquid crystalline polymer of the present invention, the proportion of the trifunctional hydroxynaphthalene carboxylic acid represented by the general formula (I) to the whole polymerizing monomers constructing the polymer may preferably be 0.01–10 mole %.

The present invention further provides a thermotropic liquid crystalline polymer composition comprising the thermotropic liquid crystalline polymer of the present invention and a reinforcing agent and/or filler. The present invention also provides a manufactured article obtained by melt processing of the thermotropic liquid crystalline polymer or the thermotropic liquid crystalline polymer composition of the present invention.

In the general formula (I), both the hydroxy group(s) (—OH) and the carboxyl group(s) (—COOH) may present at any positions on the naphthalene ring. Preferably one hydroxy group and one carboxyl group are positioned on the same benzene ring and one hydroxy or carboxyl group is positioned on the other benzene ring.

In the specification and claims attached herewith, the term "reactive derivative" represents a derivative of a monomer which can introduce said monomer unit into the polymer.

Suitable reactive derivatives of the monomers of the present invention include alkyl ester and acid halide.

In this application, "Aromatic" represents a compound having an aromatic group consisting of up to 4 condensed rings.

"Aliphatic" represents a compound having a saturated or unsaturated carbon chain consisting of 2–12 carbon atoms which may be branched.

"Alicyclic" represents a compound having a saturated carbon cycle consisting of 3–6 carbon atoms.

Examples of the trifunctional hydroxynaphthalene carboxylic acid represented by the general formula (I) include 2-hydroxynaphthalene-3,6-dicarboxylic acid, 2-hydroxynaphthalene-3,7-dicarboxylic acid, 4-hydroxynaphthalene-1,3-dicarboxylic acid, 4-hydroxynaphthalene-1,8-dicarboxylic acid, 2-hydroxynaphthalene-1,8-dicarboxylic acid, 3-hydroxynaphthalene-1,8-dicarboxylic acid, 1,4-dihydroxynaphthalene-2-carboxylic acid, 3,7-dihydroxynaphthalene-2-carboxylic acid and 3,5-dihydroxynaphthalene-2-carboxylic acid. Among the above, 2-hydroxynaphthalene-3,6-dicarboxylic acid and 3,5-dihydroxynaphthalene-2-carboxylic acid are preferably used because they can reduce anisotropy in mechanical strength and improved weld strength of the molded article while maintaining other mechanical properties. 2-hydroxynaphthalene-3,6-dicarboxylic acid is especially preferable.

The proportion of the trifunctional hydroxynaphthalene carboxylic acid represented by the general formula (I) and/or a reactive derivative thereof to the whole polymerizing monomers constructing the polymer may be preferably 0.01–10 mole %, more preferably 0.1–5 mole %. When the proportion is above 10 mole %, the obtained polymer tends to have cross-linkages which may result in less thermotropic liquid crystallinity. On the contrary when the proportion is below 0.01%, the effects of reducing anisotropy and of improving weld strength tend to be diminished.

Other polymerizing monomers used for the thermotropic liquid crystalline polymer of the present invention may be monomers used for conventional thermotropic liquid crystalline polymers including aromatic hydroxy carboxylic acids, aromatic dicarboxylic acids, aromatic diols, aromatic aminocarboxylic acids, aromatic hydroxyamines, aromatic diamines and aliphatic diols. Though otherwise be stated herein, these polymerizing monomers may be used as reactive derivatives thereof.

As other polymerizing monomers used for the present invention, oligomer(s) of one or more kind of the above monomer compounds may be subjected to the copolymerization with the compound represented by the formula (I). In the specification and claims attached herewith, in discussing the proportion of each polymerizing monomer, when an oligomer is used as the "polymerizing monomers" based on the polymerizing monomer units are counted each monomeric unit constituting the oligomer.

As other polymerizing monomers used for the thermotropic liquid crystalline polymer of the present invention, those which comprise an aromatic hydroxy carboxylic acid and those which comprise essentially equimolar of aromatic dicarboxylic acid and aromatic diol are preferably used.

More preferably as other polymerizing monomers used for the thermotropic liquid crystalline polymer of the present invention include a combination of:
an aromatic hydroxy carboxylic acid, and
at least one compound selected from the group consisting of aromatic dicarboxylic acids, aromatic diols, aromatic aminocarboxylic acids, aromatic hydroxyamines, aromatic diamines and aliphatic diols.

Among the above polymerizing monomers, a combination of:
an aromatic hydroxy carboxylic acid,
at least one compound selected from the group consisting of aromatic dicarboxylic acids and aromatic diols, and
at least one compound selected from the group consisting of aromatic aminocarboxylic acids, aromatic hydroxyamines, aromatic diamines and aliphatic diols are preferably used.

In particular, the thermotropic liquid crystalline polymer of the present invention preferably comprise as other polymerizing monomers,
an aromatic hydroxy carboxylic acid, and
essentially equimolar of at least one aromatic dicarboxylic acids and at least one aromatic diols with regard to provide the balance of the properties.

When the thermotropic liquid crystalline polymer of the present invention contains 5 mole % or more of aromatic dicarboxylic acids (based on the total polymerizing monomers), the molar ratio between
the aromatic dicarboxylic acid and
total amount of the aromatic diols, aromatic hydroxyamines, aromatic diamines and aliphatic diols is preferably in a range of from 45/55 to 55/45.

Examples of aromatic hydroxy carboxylic acids used for the present invention include 4-hydroxybenzoic acid, 3-hydroxybenzoic acid, 2-hydroxybenzoic acid, 2-hydroxy-6-naphthoic acid, 2-hydroxy-5-naphthoic acid, 2-hydroxy-7-naphthoic acid, 2-hydroxy-3-naphthoic acid, 4'-hydroxy phenyl-4-benzoic acid, 3'-hydroxy phenyl-4-benzoic acid, 4'-hydroxy phenyl-3-benzoic acid and alkyl, alkoxy or halogen substituents thereof. Alkyl and alkoxy as substituent groups have preferably 1 to 6 carbon atoms.

Among the above, 4-hydroxybenzoic acid and 2-hydroxy-6-naphthoic acid are preferably used as alone or in combination, since they can make it easy to control the properties or the melting point of the resulting liquid crystalline polyester.

In the liquid crystalline polyester of the present invention, the proportion of the aromatic hydroxy carboxylic acid to the total polymerizing monomers is preferably 10–90 mol %, more preferably 50–90 mol %.

Examples of the aromatic dicarboxylic acids which may be used as other polymerizing monomers in the liquid crystalline polyester of the present invention include terephthalic acid, isophthalic acid, 2,6-naphthalenedicarboxylic acid, 1,6-naphthalenedicarboxylic acid, 2,7-naphthalenedicarboxylic acid, 4,4'-dicarboxybiphenyl, 3,4'-dicarboxybiphenyl, 4,4"-dicarboxyterphenyl, bis(4-carboxy phenyl) ether, bis(4-carboxy phenoxy)butane, bis(4-carboxy phenyl) ethane, bis (3-carboxy phenyl)ether and bis(3-carboxy phenyl)ethane and alkyl, alkoxy or halogen substituents thereof.

Among the above, terephthalic acid, isophthalic acid and 2,6-naphthalenedicarboxylic acid are preferably used, and especially terephthalic acid is preferable since it can effectively improve heat resistance of the resulting liquid crystalline polymer.

When the thermotropic liquid crystalline polymer of the present invention comprises an aromatic dicarboxylic acid, its proportion to the total polymerizing monomers is preferably no more than 45 mole %, more preferably no more than 25 mole %.

Examples of aromatic diols used as other polymerizing monomers in the present invention include hydroquinone, resorcin, 2,6-dihydroxynaphthalene, 2,7-dihydroxynaphthalene, 1,6-dihydroxynaphthalene, 3,3'-dihydroxybiphenyl, 3,4'-dihydroxybiphenyl, 4,4'-dihydroxybiphenyl, 4,4'-dihydroxy biphenol ether, bis(4-hydroxy phenyl)ethane, 2,2'-dihydroxy binaphthyl, and alkyl, alkoxy or halogen substituents thereof.

Among the above, hydroquinone, resorcin, 4,4'-dihydroxybiphenyl and 2,6-dihydroxynaphthalene are preferably used, and especially hydroquinone, 4,4'-dihydroxybiphenyl or 2,6-dihydroxynaphthalene is preferable because of the good reactivity during the polymerization process.

Examples of the aromatic hydroxyamines used as other polymerizing monomers in the present invention include 4-amino phenol, N-methyl-4-amino phenol, 3-amino phenol, 3-methyl-4-amino phenol, 4-amino-1-naphthol, 4-amino-4'-hydroxy biphenyl, 4-amino-4'-hydroxy biphenyl ether, 4-amino-4'-hydroxy biphenyl methane, 4-amino-4'-hydroxy biphenyl sulfide and 2,2'-diamino binaphthyl. Among the above, 4-amino phenol is preferably used because it contributes to the good balance of properties of the resulting polymer.

When aromatic diols and/or aromatic hydroxyamines are used, their total proportion to the whole polymerizing monomers is preferably no more than 45 mole %, more preferably no more than 25 mole %.

According to the invention, the thermotropic liquid crystalline polymer of the present invention preferably comprises at least one compound selected from the group consisting of aromatic dicarboxylic acids, aromatic diols and aromatic hydroxyamines, because said compounds can facilitate controlling generation of branched polymer chains upon the copolymerization due to reaction with the trifunctional hydroxy naphthalene carboxylic acid represented by the general formula (I).

In addition, unless impair the object of the present invention, the thermotropic liquid crystalline polymer of the present invention may be copolymerized with polymerizable monomers of other than those described above. Examples of such polymerizing monomers include aromatic diamines, aromatic aminocarboxylic acids, alicyclic dicarboxylic acids, aliphatic diols, alicyclic diols, aromatic mercapto carboxylic acids, aromatic dithiols, aromatic mercapto phenols and reactive derivatives thereof. Among the above, aromatic diamines, aromatic aminocarboxylic acids and aliphatic diols are preferably used. The proportion of these monomers to the total polymerizing monomers is preferably no more than 20 mole %.

Examples of aromatic diamines and aromatic aminocarboxylic acids include 1,4-phenylene diamine, 1,3-phenylene diamine, N-methyl-1,4-phenylene diamine, N,N'-dimethyl-1,4-phenylene diamine, 4,4'-diamino phenyl sulfide(thiodianiline), 4,4'-diamino biphenyl sulfone, 2,5-diamino toluene, 4,4'-ethylene dianiline, 4,4'-diamino biphenoxy ethane, 4,4'-diamino biphenyl methane(methylene dianiline), 4,4'-diamino biphenyl ether(oxydianiline), 4-amino benzoic acid, 3-amino benzoic acid, 6-amino-2-naphthoic acid and 7-amino-2-naphthoic acid. As aromatic diamines, 1,4-phenylene diamine and 1,3-phenylene diamine is especially preferable and as aromatic aminocarboxylic acids, 4-amino benzoic acid is especially preferable.

Examples of alicyclic dicarboxylic acids, aliphatic diols and alicyclic diols include hexahydro terephthalic acid and linear or branched aliphatic diols such as trans-1,4-cyclohexane diol, cis-1,4-cyclohexane diol, trans-1,4-cyclohexane dimethanol, cis-1,4-cyclohexane dimethanol, trans-1,3-cyclohexane diol, cis-1,2-cyclohexane diol, trans-1,3-cyclohexane dimethanol, ethylene glycol, propylene glycol, butylene glycol, 1,3-propane diol, 1,2-propane diol, 1,4-butane diol, 1,6-hexane diol and neopentyl glycol as well as reactive derivatives thereof. Among the above, ethylene glycol, propylene glycol and butylene glycol are preferably used.

Examples of aromatic mercapto carboxylic acids, aromatic dithiols and aromatic mercapto phenols include 4-mercapto benzoic acid, 2-mercapto-6-naphthoic acid, 2-mercapto-7-naphthoic acid, benzene-1,4-dithiol, benzene-1,3-dithiol, 2,6-naphthalene-dithiol, 2,7-naphthalene-dithiol, 4-mercapto phenol, 3-mercapto phenol, 6-mercapto-2-hydroxynaphthalene, 7-mercapto-2-hydroxynaphthalene and reactive derivatives thereof.

The thermotropic liquid crystalline polymer of the present invention exhibits anisotropic melt phase. The anisotropic melt phase can be confirmed by means of conventional polarized light system using orthogonal light polarizer. In more detail, the sample on the Leitz's hot stage under nitrogen atmosphere may be observed with Leitz's polarization microscope at 40-magunification. The above-described polymer is optically anisotropic. That is, the polymer transmits light when observed under orthogonal light polarizer. When a sample is optically anisotropic, the sample transmit polarized light even under static state.

In the present invention, preferable examples of combinations of polymerizing monomers which constitute the thermotropic liquid crystalline polymer with the essential component, trifunctional hydroxynaphthalene carboxylic acid, may include:

4-hydroxybenzoic acid/2-hydroxy-6-naphthoic acid
4-hydroxybenzoic acid/terephthalic acid/4,4'-dihydroxybiphenyl
4-hydroxybenzoic acid/terephthalic acid/isophthalic acid/4,4'-dihydroxybiphenyl
4-hydroxybenzoic acid/terephthalic acid/isophthalic acid/4,4'-dihydroxybiphenyl/hydroquinone
4-hydroxybenzoic acid/terephthalic acid/hydroquinone
4-hydroxybenzoic acid/2-hydroxy-6-naphthoic acid/terephthalic acid/4,4'-dihydroxybiphenyl
4-hydroxybenzoic acid/2-hydroxy-6-naphthoic acid terephthalic acid/hydroquinone
4-hydroxybenzoic acid/2,6-naphthalenedicarboxylic acid/4,4'-dihydroxybiphenyl
4-hyrdoxybenzoic acid/terephthalic acid/2,6-naphthalenedicarboxylic acid/hydroquinone
4-hyrdoxybenzoic acid/2,6-naphthalenedicarboxylic acid/hydroquinone
4-hyrdoxybenzoic acid/2-hydroxy-6-naphthoic acid/2,6-naphthalenedicarboxylic acid/hydroquinone
4-hyrdoxybenzoic acid/terephthalic acid/2,6-naphthalenedicarboxylic acid/hydroquinone/4,4'-dihydroxybiphenyl
4-hyrdoxybenzoic acid/terephthalic acid/4-amino phenol
4-hyrdoxybenzoic acid/terephthalic acid/4,4'-dihydroxybiphenyl/4-amino phenol
4-hyrdoxybenzoic acid/2-hydroxy-6-naphthoic acid/p-phenylenediamine
4-hyrdoxybenzoic acid/2-hydroxy-6-naphthoic acid/4-amino benzoic acid
4-hyrdoxybenzoic acid/terephthalic acid/ethylene glycol
4-hyrdoxybenzoic acid/terephthalic acid/4,4'-dihydroxybiphenyl/ethylene glycol
4-hyrdoxybenzoic acid/2-hydroxy-6-naphthoic acid/terephthalic acid/ethylene glycol
4-hyrdoxybenzoic acid/2-hydroxy-6-naphthoic acid/terephthalic acid/4,4'-dihydroxybiphenyl/ethylene glycol
Terephthalic acid/butyl hydroquinone/phenyl hydroquinone
Terephthalic acid/phenyl hydroquinone/bisphenol A.

In the thermotropic liquid crystalline polymer of the present invention, other multifunctional polymerizing monomers which have 3 or more functional groups may be used with the trifunctional hydroxynaphthalene carboxylic acid represented by the general formula (I). Examples of such other multifunctional polymerizing monomers include 4-hydroxy isophthalic acid, 5-hydroxy isophthalic acid, trimellitic acid, 1,3,5-benzene tricarboxylic acid and pyromellitic acid. When other multifunctional polymerizing monomers are used, the proportion of them to the total polymerizing monomers is preferably 0.01–5 mole %.

The trifunctional hydroxynaphthalene carboxylic acid used for the thermotropic liquid crystalline polymer of the present invention may be prepared by any conventional method. For example, 2-hydroxynaphthalene-3,6-dicarboxylic acid may be obtained according to the method described in WO98/17621, but not limited to this method.

The present invention further provides a method for preparing a thermotropic liquid crystalline polymer comprising adding a trifunctional hydroxynaphthalene carboxylic acid represented by the general formula (I) to a reaction system to copolymerize the trifunctional hydroxy naphthalene carboxylic acid with other polymerizing monomer(s).

In the method of the invention, the trifunctional hydroxynaphthalene carboxylic acid represented by the general formula (I) may be added to the reaction system together with other polymerizing monomers at the same time or may be added separately, all at once or sequentially before completing the copolymerizing process.

The method for preparing the thermotropic liquid crystalline polymer of the present invention is not limited and any known method can be employed. For example, conventional method for preparing a thermotropic liquid crystalline polymer to give ester bondings among the trifunctional hydroxynaphthalene carboxylic acid represented by the general formula (I) and other polymerizing monomer components in the above combination such as molten acidolysis method and slurry polymerization method may be employed.

The molten acidolysis method is preferably used for the present invention. In this method, the polymerizing monomers are firstly heated to give molten solution of the reactants and then the solution is reacted to give the molten polymer. The final step of this method may be carried out under vacuum to facilitate removal of volatile by-products such as acetic acid or water.

The slurry polymerization method is characterized in that monomers are reacted in a heatexchange fluid to give solid state polymer as suspension in the heatexchange liquid medium.

In either of the molten acidolysis method or the slurry polymerization method, the trifunctional hydroxynaphthalene carboxylic acid represented by the general formula (I) and other polymerizing monomer components used for the preparation of thermotropic liquid crystalline polymer may be subjected to the reaction in the denatured form that obtained by esterifying the hydroxyl group at the ambiebt temperature, i.e. in the form of lower acyl esters.

The lower acyl group may have preferably 2–5, more preferably 2–3 carbon atoms, and acetic esters of the polymerizing monomeric components are most preferably used for the reaction.

The lower acyl esters of the polymerizing monomers may be prepared beforehand by acylating them independently or may be produced in the reaction system by adding acylating agent such as acetic anhydride to polymerizing monomers during the preparation process of the thermotropic liquid crystalline polymer.

In either of the molten acidolysis method or the slurry polymerization method, the polymerizing reaction may preferably be carried out at a temperature of 150–400° C., more preferably 250–370° C. under ambient pressure and/or reduced pressure. A catalyst may be used, if desired.

Examples of catalysts include organic tin compounds such as dialkyl tin oxide (ex. dibutyl tin oxide) and diaryl tin oxide; organic titanium compounds such as titanium dioxide, antimony trioxide, alkoxy titanium silicate and titanium alkoxide; alkaline or alkaline earth metal salt of carboxylic acid such as potassium acetate; and gaseous acid catalysts such as Lewis acid (ex. $BF_3$) and halogenated hydrogen (ex. HCl).

When a catalyst is used, the amount of the catalyst added to the reaction based on the total polymerizing monomers may be preferably 5–1000 ppm, and more preferably 10–200 ppm.

Preferably, the thermotropic liquid crystalline polymer of the present invention is that log viscosity of the same can be measured in pentafluorophenol. The log viscosity of the polymer measured at a concentration of 0.1 g/dl in pentafluorophenol at 60° C. may preferably be 0.3 dl/g or above, more preferably 0.5–10 dl/g, most preferably 1–8 dl/g.

The melting viscosity of the thermotropic liquid crystalline polymer of the present invention measured with capillary rheometer may preferably be 1–1000 Pa·s, more preferably 5–300 Pa·s.

The present invention further provides a thermotropic liquid crystalline polymer composition obtained by admixing reinforcing agent and/or filler to the thermotropic liquid crystalline polymer. The form of the reinforcing agent and/or filler may be any of conventional reinforcing agents and/or fillers for resin compositions such as fibrous, lamellar or particulate form.

Examples of fibrous reinforcing agents and fillers may include glass fiber, silica-alumina fiber, alumina fiber, carbon fiber and aramid fiber. Among them, glass fiber is preferably used because of its good balance of physical properties and cost.

Examples of lamellar or particulate fillers may include talc, mica, graphite, wollastonite, calcium carbonate, dolomite, clay, glass flake, glass beads, barium sulfate and titanium oxide.

The reinforcing agent and/or filler may be added to: the thermotropic liquid crystalline polymer of the present invention, alone or in combination. The reinforcing agents and/or fillers may be added to the liquid crystalline polymer composition in an amount of 0–100 parts by weight, especially 20–70 parts by weight to 100 parts by weight of the thermotropic liquid crystalline polymer.

The thermotropic liquid crystalline polymer composition according to the present invention may be further admixed with one or more additives conventionally used for resin compositions, if desired, for example molding lubricant such as higher aliphatic acid, higher aliphatic ester, higher aliphatic amide, higher aliphatic acid metal salt, polysiloxane, fluorocarbon resin; colorant such as dyes and pigments; antioxidant; thermal stabilizer; UV absorbent; antistatic agent and surface active agent.

Additionally, to the pellets of the thermotropic liquid crystalline polymer or the thermotropic liquid crystalline polymer composition according to the present invention, an agent which provides an exterior lubricant effect such as higher aliphatic acid, higher aliphatic ester, higher aliphatic acid metal salt or fluorocarbon-type surfactant may be added so that the agent adhere to the surface of the pellet, before subjecting the pellets to the injection-molding process.

To the thermotropic liquid crystalline polymer of the present invention, one or more other resin components may be added. Examples of other resin components include thermoplastic resins such as polyamide, polyester, polyphenylene sulfide, polyether ketone, polycarbonate, polyphenylene ether and denatured derivatives thereof, polysulfone, polyethersulfone and polyether imide and thermosetting resins such as phenol resin, epoxy resin and polyimide resin. The thermotropic liquid crystalline polymer composition comprising other resin components may be included in the scope of the invention.

The amount of other resin components added to the polymer may be determined according to the use of the resin composition and preferably, up to 100 parts by weight, preferably up to 50 parts by weight of other resin components may be added to 100 parts by weight of the thermotropic liquid crystalline polymer.

The thermotropic liquid crystalline polymer composition of the present invention may be obtained by adding fillers, reinforcing agents and other resin components to the liquid crystalline polymer and melt kneading the mixture at a temperature from near the melting point of the polymer to the melting point plus 100° C. using a kneading machine such as Banbury mixer, kneader, single screw extruder, twin screw extruder or the like.

The thermotropic liquid crystalline polymer or the thermotropic liquid crystalline polymer composition according to the present invention may be molded using a conventional melt molding process, preferably injection molding, compression molding, extrusion molding and blow molding. Especially the polymer may be applied to film extrusion with T-die, blow film molding by means of inflation molding or the like and melt spinning. The molded article obtained with the thermotropic liquid crystalline polymer of the present invention such as injection molded article, film, fiber and container exhibits less anisotropy and, when the molded article has any weldline, improved weld strength. Accordingly the thermotropic liquid crystalline polymer or the thermotropic liquid crystalline polymer composition according to the present invention is particular useful for parts of electric and electronic devices, machines and automobiles.

EXAMPLES

The present invention is further described in reference to the following Examples. The following examples are intended to illustrate the invention and are not to be construed to limit the scope of the invention. In the examples, parameters were measured as follows.

<Melting Point>

Using differential scanning calorimeter, the polymer was heated from 50° C. to 355° C. at a speed of 20° C./min, and the endothermic peak top temperature was taken as a melting point.

<Log Viscosity>

The obtained polymer was dissolved in pentafluorophenol to give 0.1 wt % polymer solution. The time required for free fall of the polymer solution in the capillary tube of Ubbelohde viscometer was measured in a 60° C. thermostat bath, and the log viscosity η was calculated <Flexural Strength>

The resin obtained was subjected to an injection molding machine with clamping pressure of 15 tons (cylinder temperature: melting point plus 30° C., mold temperature: 70° C.) to give test pieces for the flexural test of 12.7×64×1.6 (mm). The pieces were molded using either a usual mold having one gate at the end or a weldline type mold having two gates at both ends. The flexural strength of each was measured and to the retention of weldline flexural strength (weldline flexural strength/flexural strength×100) was calculated. The flexural strength test was carried out according to ASTM D790.

<Linear Expansion Coefficient>

The flexural test piece as above was cut from the center part in the machine direction (hereinafter, MD), and also in the transverse direction (hereinafter, TD), to give test pieces of 12.7×64×1.6 (mm). The linear expansion coefficient at 23° C.–200° C. of the TD and MD directions were measured according to ASTM D696.

Example 1

The following compounds were fed in a reaction container equipped with an agitating blade and a condenser, and the deacetic acid polycondensation reaction was carried out by the following condition.

4-hydroxybenzoic acid: 70.81 mole %
2-hydroxy-6-naphthoic acid: 26.19 mole %
4,4'-dihydroxybiphenyl: 1 mole %
2-hydroxynaphethalene-3,6-dicarboxylic acid: 2 mole %
Acetic anhydride: 6.8 moles
Potassium acetate: 26 ppm Under the nitrogen atmosphere, the mixture was heated from 40° C. to 150° C. over 1 hour, kept at 150° C. for 0.5 hour, heated to 325° C. over 5 hours and reacted at 325° C. for 10 minutes, and then reduced the pressure at 325° C. Fifteen minutes after, the pressure was reduced to 200 mmHg. And the stirring torque was reached to the predetermined level. At the time, the polycondensation reaction was made to complete. As a result, approximately theoretical amount of acetic acid was distilled out and a polymer with the following theoretical structural formula was obtained:

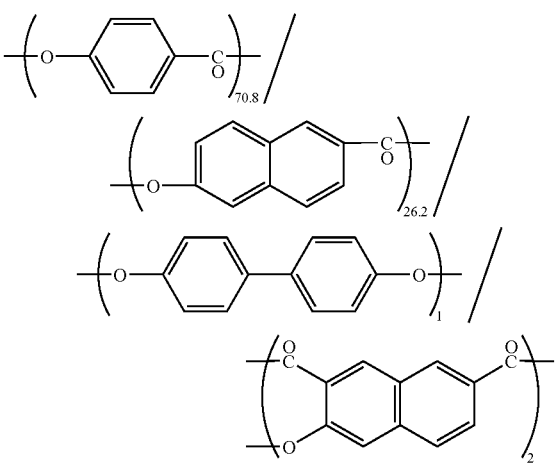

The log viscosity of this polymer was η=5.7 and melting point was 275° C.

The obtained polymer was crushed and then molded to evaluate weldline strength and linear expansion coefficients of TD and MD directions. The result is shown in Table 1 together with the log viscosity η and melting point.

Example 2

The following compounds were fed in a reaction container equipped with an agitating blade and a condenser, and polycondensation and molding processes were conducted in the same manner as Example 1. The weldline strength and linear expansion coefficients of TD and MD directions were evaluated. The result is shown in Table 1 together with the log viscosity η and melting point.

4-hydroxybenzoic acid: 69.35 mole %
2-hydroxy-6-naphthoic acid: 25.65 mole %
4,4'-dihydroxybiphenyl: 1 mole %
2-hydroxynaphethalene-3,6-dicarboxylic acid: 4 mole %
Acetic anhydride: 6.78 moles

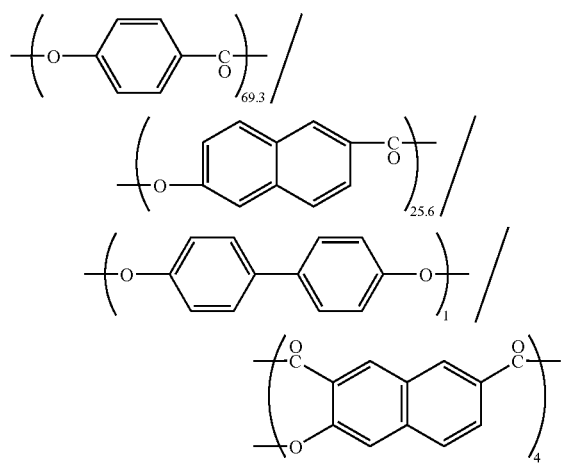

Example 3

The following compounds were fed in a reaction container equipped with an agitating blade and a condenser, and polycondensation and mold were conducted in the same manner as Example 1. The weldline strength and linear expansion coefficients of TD and MD directions were evaluated. The result is shown in Table 1 together with the log viscosity η and melting point.

4-hydroxybenzoic acid: 68.44 mole %
2-hydroxy-6-naphthoic acid: 25.31 mole %
Terephthalic acid: 1.25 mole %
2-hydroxynaphethalene-3,6-dicarboxylic acid: 5 mole %
Acetic anhydride: 6.6 moles

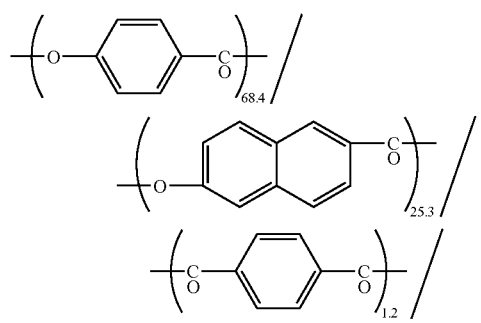

-continued

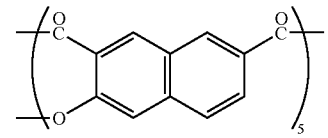

Example 4

The following compounds were fed in a reaction container equipped with an agitating blade and a condenser, and polycondensation and mold were conducted in the same manner as Example 1. The weldline strength and the linear expansion coefficients of TD and MD directions were evaluated. The result is shown in Table 1 together with the log viscosity η and melting point.

4-hydroxybenzoic acid: 64 mole %
Hydroquinone: 17 mole %
2,6-naphethalene dicarboxylic acid: 17 mole %
2-hydroxynaphethalene-3,6-dicarboxylic acid: 2 mole %
Acetic anhydride: 6.7 moles

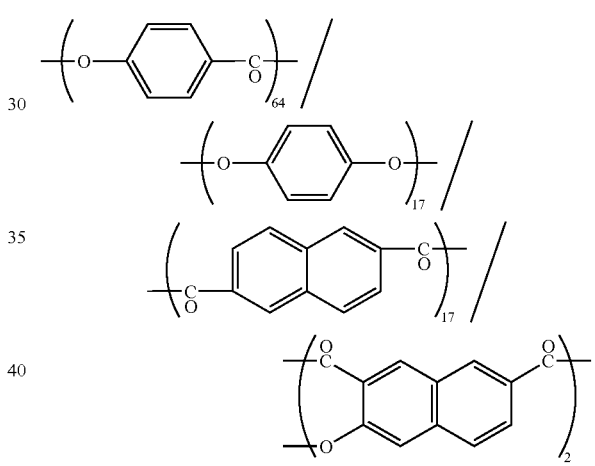

Example 5

The following compounds were fed in a reaction container equipped with an agitating blade and a condenser, and polycondensation and mold were conducted in the same manner as Example 1. The weldline strength and the linear expansion coefficients of TD and MD directions were evaluated. The result is shown in Table 1 together with the log viscosity η and melting point.

4-hydroxybenzoic acid: 69.35 mole %
2-hydroxy-6-naphthoic acid: 25.65 mole %
4,4'-dihydroxybiphenyl: 1 mole %
3,5-dihydroxynaphethalene-2-carboxylic acid: 4 mole %
Acetic anhydride: 7.0 moles

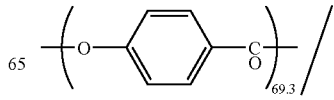

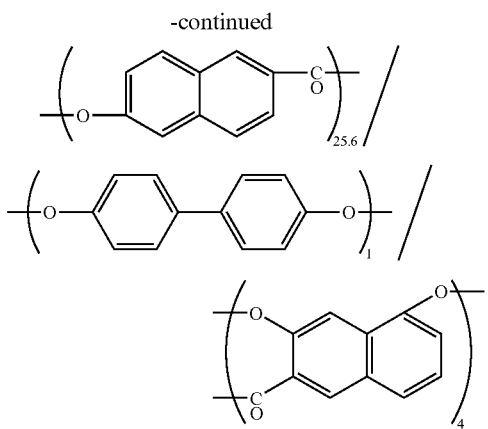

Comparative Example 1

The following compounds were fed in a reaction container equipped with an agitating blade and a condenser, and polycondensation and mold were conducted in the same manner as Example 1. The weldline strength and linear expansion coefficients of TD and MD directions were evaluated. The result is shown in Table 1 together with the log viscosity η and melting point.

4-hydroxybenzoic acid: 73 mole %
2-hydroxy-6-naphthoic acid: 27 mole %
Acetic anhydride: 6.7 moles

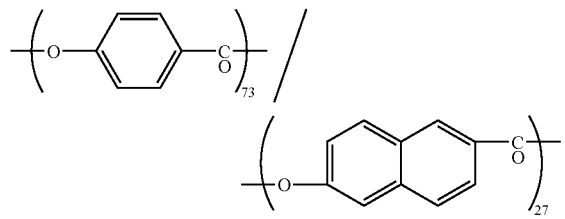

Comparative Example 2

The following compounds were fed in a reaction container equipped with an agitation blade and a condenser, and polycondensation and mold were conducted in the same manner as Example 1. The weldline strength and linear expansion coefficients of TD and MD directions were evaluated. The result is shown in Table 1 together with the log viscosity η and melting point.

4-hydroxybenzoic acid: 4.68 mole %
2-hydroxy-6-naphthoic acid: 1.75 mole %
4,4'-dihydroxybiphenyl: 0.06 mole %
Pyromellitic acid: 0.04 mole %
Acetic anhydride: 6.8 moles
Potassium acetate: 26 ppm

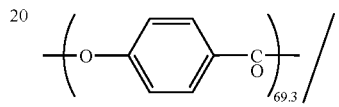

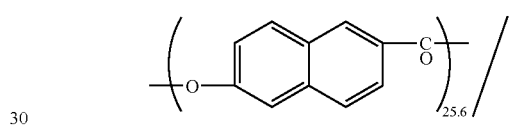

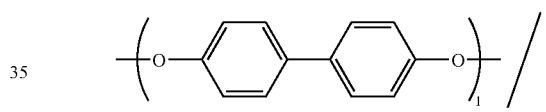

TABLE 1

| | melting point (° C.) | low viscosity η | flexural strength (MPa) | weldline flexural strength (MPa) | retention of weldline flexural strength (%) | linear expansion coefficient | | |
|---|---|---|---|---|---|---|---|---|
| | | | | | | TD × $10^5$ (1/K) | MD × $10^5$ (1/K) | TD/MD |
| Ex. 1 | 275 | 5.7 | 174 | 44 | 25 | 4.8 | 0.62 | 7.7 |
| Ex. 2 | 273 | 5.1 | 169 | 47 | 28 | 4.0 | 0.59 | 6.8 |
| Ex. 3 | 271 | 4.2 | 164 | 39 | 24 | 4.6 | 0.63 | 7.3 |
| Ex. 4 | 292 | 4.8 | 159 | 35 | 22 | 3.9 | 0.56 | 7.0 |
| Ex. 5 | 272 | 4.8 | 170 | 36 | 21 | 5.4 | 0.57 | 9.5 |
| Co. 1 | 282 | 5.5 | 168 | 15 | 9 | 5.5 | 0.20 | 28 |
| Co. 2 | 281 | 6.4 | 181 | 24 | 13 | 5.9 | 0.31 | 19 |

Based on the results shown in table 1, the thermotropic liquid crystalline polymer of the present invention copolymerized with a trifunctional hydroxynaphthalene carboxylic acid therein exhibited improved weldline strength at the thin portion and reduced anisotropy of the linear expansion coefficient while kept the good flexural strength compared with comparative example 1, without the trifunctional hydroxynaphthalene carboxylic acid and with comparative example 2 with pyromellitic acid therein.

INDUSTRIAL APPLICABILITY

The thermotropic liquid crystalline polymers of the present invention are suitably used for electric and electronic components such as computer-related parts, machine components and precision machinery components. It can be used for motor components such as connector, relay case, switch, coil bobbin, condenser, connector, speaker, committator and separator and also used for shielding elements such as coil, crystal and IC chip.

What is claimed is:

1. A thermotropic liquid crystalline polymer, which is obtainable by copolymerizing a trifunctional hydroxynaphthalene carboxylic acid represented by the general formula (I) and/or reactive derivative thereof with other polymerizing monomer(s)

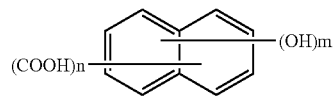

wherein one of m and n is 1 and the other is 2.

2. The thermotropic liquid crystalline polymer of claim 1, wherein the trifunctional hydroxynaphthalene carboxylic acid represented by general formula (I) is 2-hydroxynaphthalene-3,6-dicarboxylic acid or 3,5-dihydroxynaphthalene-2-carboxylic acid.

3. The thermotropic liquid crystalline polymer of claim 1, wherein the proportion of the trifunctional hydroxynaphthalene carboxylic acid represented by the general formula (I) to the total polymelizing monomers is 0.01–10 mole %.

4. The thermotropic liquid crystalline polymer of claim 1, wherein other polymerizing monomer(s) is at least one compound(s) selected from the group consisting of aromatic hydroxy carboxylic acid, aromatic dicarboxylic acid, aromatic diol, aromatic aminocarboxylic acid, aromatic hydroxyamine, aromatic diamine and aliphatic diol.

5. The thermotropic liquid crystalline polymer of claim 4, wherein other polymerizing monomers comprise aromatic dicarboxylic acid and aromatic diol, and the amounts of aromatic dicarboxylic acid and aromatic diol are equimolar.

6. The thermotropic liquid crystalline polymer of claim 4, wherein other polymerizing monomer(s) include aromatic hydroxy carboxylic acid.

7. The thermotropic liquid crystalline polymer of claim 6, wherein the proportion of the aromatic hydroxy carboxylic acid to the total polymerizing monomers is 10–90 mole %.

8. The thermotropic liquid crystalline polymer of claim 6, wherein other polymerizing monomer(s) further include at least one compound selected from the group consisting of aromatic dicarboxylic acid, aromatic diol, aromatic aminocarboxylic acid, aromatic hydroxyamine, aromatic diamine and aliphatic diol.

9. The thermotropic liquid crystalline polymer of claim 6, wherein other polymerizing monomer(s) further include at least one compound selected from the group consisting of aromatic dicarboxylic acid and aromatic diol.

10. The thermotropic liquid crystalline polymer of claim 9, wherein other polymerizing monomer(s) further comprise at least one compound selected from the group consisting of aromatic aminocarboxylic acid, aromatic hydroxyamine, aromatic diamine and aliphatic diol.

11. The thermotropic liquid crystalline polymer of claim 10, wherein the molar ratio of aromatic dicarboxylic acid to the total amount of aromatic diol, aromatic hydroxyamine, aromatic diamine and aliphatic diol is in the range of from 45/55 to 55/45.

12. The thermotropic liquid crystalline polymer of claim 4, wherein aromatic hydroxy carboxylic acid is at least one compound selected from the group consisting of 4-hydroxybenzoic acid and 2-hydroxy-6-naphthoic acid.

13. The thermotropic liquid crystalline polymer of claim 4, wherein aromatic dicarboxylic acid is at least one compound selected from the group consisting of terephthalic acid, isophthalic acid and 2,6-naphthalenedicarboxylic acid.

14. The thermotropic liquid crystalline polymer of claim 4, wherein aromatic diol is at least one compound selected from the group consisting of hydroquinone, resorcin, 2,6-dihydroxynaphthalene and 4,4'-dihydroxybiphenyl.

15. A thermotropic liquid crystalline polymer composition comprising the thermotropic liquid crystalline polymer of any of claims 1 to 14 and a reinforcing agent and/or filler.

16. A thermotropic liquid crystalline polymer composition comprising the thermotropic liquid crystalline polymer of any of claims 1 to 14 and other resin component.

17. A product selected from the group consisting of molded article, film and fiber, which is obtained by melt molding of the thermotropic liquid crystalline polymer of any one of claims 1 to 14.

18. A product selected from the group consisting of molded article, film and fiber, which is obtained by melt molding of the thermotropic liquid crystalline polymer composition of claim 15.

19. The thermotropic liquid crystalline polymer of claim 3, wherein the trifunctional hydroxynaphthalene carboxylic acid represented by general formula (I) is 2-hydroxynaphthalene-3,6-dicarboxylic acid.

* * * * *